United States Patent [19]
Berry et al.

[11] 3,880,235
[45] Apr. 29, 1975

[54] METHOD AND APPARATUS FOR IGNITING WELL HEATERS

[75] Inventors: Holland J. Berry; William C. Hardy; Dale W. Zadow, all of Richardson, Tex.

[73] Assignee: Sun Oil Company (Delaware), Dallas, Tex.

[22] Filed: May 15, 1972

[21] Appl. No.: 255,882

Related U.S. Application Data

[62] Division of Ser. No. 889,060, Dec. 30, 1969, Pat. No. 3,680,635.

[52] U.S. Cl.................................. 166/302; 166/59
[51] Int. Cl............................................ E21b 43/24
[58] Field of Search ...... 166/59, 60, 302; 23/288 R, 23/288 H, 288 J; 431/268, 329

[56] References Cited
UNITED STATES PATENTS

| | | | |
|---|---|---|---|
| 3,215,495 | 11/1965 | Jenks et al. | 23/288 R |
| 3,240,256 | 3/1966 | Binkley et al. | 431/268 |
| 3,244,231 | 4/1966 | Grekel | 166/59 |
| 3,245,459 | 4/1966 | Keith | 431/329 |
| 3,376,932 | 4/1968 | Hunt | 166/59 |
| 3,407,025 | 10/1968 | Hardison | 431/329 |
| 3,485,230 | 12/1969 | Harrington et al. | 431/329 |
| 3,497,000 | 2/1970 | Hujsak et al. | 166/59 |
| 3,706,303 | 12/1972 | Hapgood | 431/329 |

Primary Examiner—Frank L. Abbott
Assistant Examiner—Jack E. Ebel
Attorney, Agent, or Firm—George L. Church; Donald R. Johnson; John E. Holder

[57] ABSTRACT

Ignitors are provided for initiating fuel fed well heaters located adjacent earth formations in a wellbore. The ignitors are battery powered and subsist independently downhole. Batteries are used to provide current to a heating element or, in conjunction with an oscillator and transformer can be used to generate an electric arc using a spark gap. Additionally, a catalytic ignitor can be used in conjunction with a hydrogen containing fuel gas, thereby providing a spontaneous hydrogen and air reaction. The hydrogen-air reaction raises the temperature to that of natural gas ignition.

17 Claims, 9 Drawing Figures

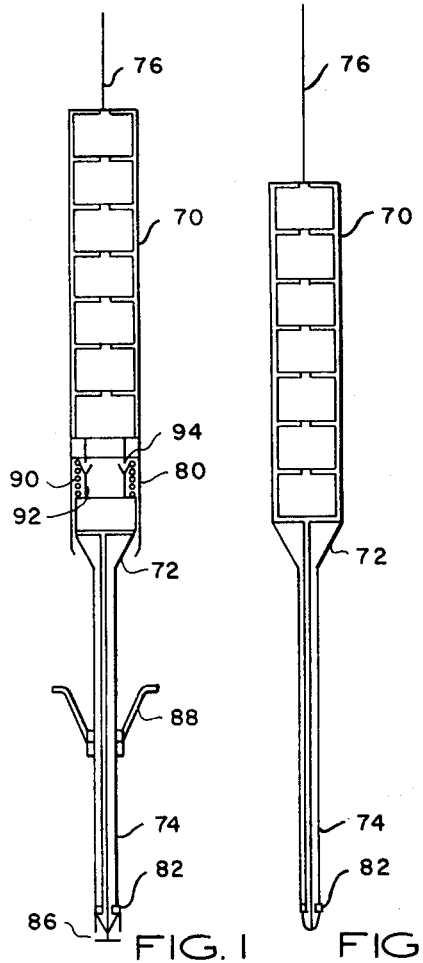
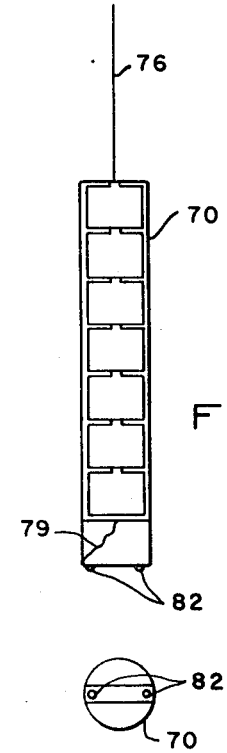
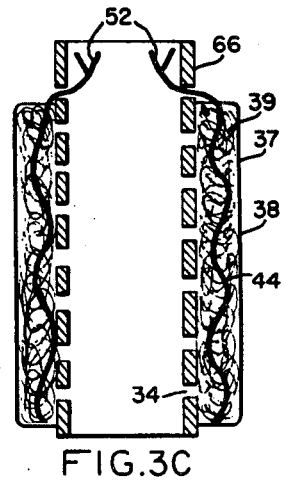
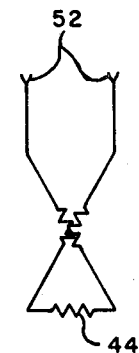
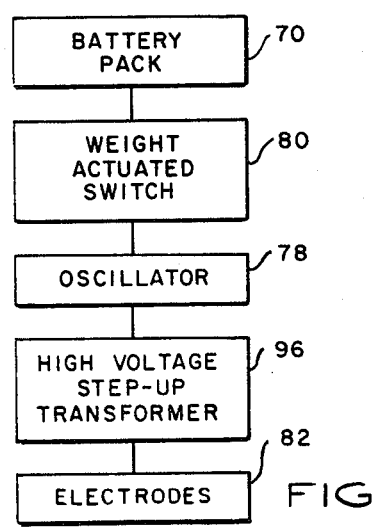
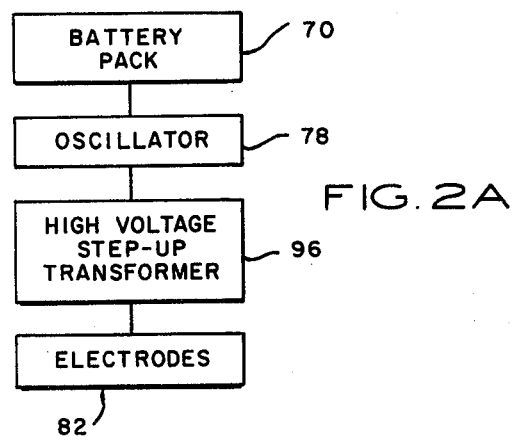

METHOD AND APPARATUS FOR IGNITING WELL HEATERS

BACKGROUND OF THE INVENTION

This application is a division of co-pending application, Ser. No. 889,060, filed Dec. 30, 1969 and now U.S. Pat. No. 3,680,635.

This invention relates to ignitors for well heaters, and is related to two co-pending cases filed of even date herewith and entitled "METHOD AND APPARATUS FOR CATALYTIC IGNITION OF EARTH FORMATIONS" Ser. No. 889,059, now abandoned, together with a continuation in part of Ser. No. 889,059, entitled "METHOD AND APPARATUS FOR CATALYTICALLY HEATING WELLBORES", Ser. No. 92,836 filed Dec. 25, 1970 and now U.S. Pat. No. 3,712,375 and "METHOD AND APPARATUS FOR IGNITION AND HEATING OF EARTH FORMATIONS", Ser. No. 889,061, filed Dec. 30, 1969. Several methods have been utilized to provide heat to well formations for the purposes of "in situ" combustion and well stimulation. Well stimulation is provided by heat in that the viscosity of the hydrocarbon in the formation is lowered and paraffin adjacent the wellbore is melted.

"In situ" combustion involves igniting the hydrocarbon in the formation so that the heat from the combustion lowers the viscosity of the oil in front of it and gasifies lighter hydrocarbons, thereby providing a pressure to drive the hydrocarbons in the direction of a producing well. The "in situ" combustion process involves several steps. First, air is injected into the oil bearing formation through an injection well. The injection pressure should be sufficient to cause the air to flow through the formation from the injection well to one or more producing wells, and it is injected at a sufficient rate to support a vigorous combustion reaction of a fraction of the oil in the formation. Additionally, the air pressure forces the oil away from the casing, so that the well is relatively free of liquids.

In order to initiate a combustion reaction in most oil bearing formations, it is necessary to inject heat along with the air. The heat is carried by the air into the reservoir where it contacts the formation oil. By flowing a sufficient volume of hot air into the reservoir, the cool oil in the vicinity of the injection well is heated to its ignition temperature and commences to burn.

There are several methods of igniting the oil in the formation including the use of downhole electrical heaters, downhole gas burners, and spontaneous combustion reactions occurring when unheated air is injected into the formation. The downhole electrical heater is used primarily in shallow wells because of the limitations caused by the necessity of using electrical cables from the surface to the heater. At depths greater than 3,000 feet, the voltage drop in the cables currently in use results in a considerable reduction in the voltage available to the heater. Moreover, because of the mandatory small cable size, the allowable line current must be limited to prevent damage to the cable insulation by overheating. Voltage dissipation due to the cable resistance would require initial voltages in excess of what can practically be provided and safely operated.

Spontaneous combustion reactions generally occur in napthenic crudes, and seldom occur in paraffinic crudes. Therefore, gas burners have been employed for most deep paraffinic wells. However, there have been problems related to downhole gas burners in that well damage occurs frequently, due to the intense heat generated by gas combustion and the method for igniting the heater. Ordinarily, in downhole gas burners an orifice or nozzle is surrounded by a cylindrical heat shield, and is run on standard oil field tubing to the vicinity of the top of the formation which is to be heated. Gas is flowed down the tubing through the nozzle and into the heat shield. Air is flowed down the annular space between tubing and the casing to the bottom of the wellbore where part of the air enters the heat shield and mixes with the gas entering the formation being heated. When the burner is ignited, heat from the gas combustion is transferred to the balance of the air which is entering the formation. This heated air raises the temperature in the formation surrounding the wellbore until the formation hydrocarbons are ignited. Upon ignition of the formation, fuel gas is no longer injected, and air is pumped to the formation to support combustion of the formation hydrocarbons.

To ignite this gas-air mixture, pyrophoric chemicals have generally been used. These chemicals are in wide use and are highly combustible in air at standard conditions. When pyrophoric chemicals are used, special precautions must be taken. One such precaution is a purging of the lubricator and tubing of all air, generally with nitrogen, thus depriving the pyrophoric chemical of air until it reaches the heater. This method of ignition is often not successful, since the fuel mixture must be present in proper proportions to initiate combustion of the fuel gas. If the fuel gas and air mixture is too rich when contacted by the pyrophoric chemicals, an explosion will probably occur, causing serious damage to the heat shield, tubing, casing, and formation. When the fuel-air mixture is too lean, the pyrophoric chemicals will not ignite the mixture, and the process has to be repeated. The rich and lean mixtures are caused by poor mixing, thereby creating areas which are predominantly fuel-gas or air. Poor mixing is not uncommon, and explosions resulting therefrom are not infrequent.

Because of such problems as set forth above, it is an object of the present invention to provide new and improved well heater ignitors.

SUMMARY OF THE INVENTION:

With this and other objects in view, the present invention includes battery powered ignitors which can be adapted to provide electrical energy to a heating coil or provide electrical energy for initiating an electric arc in the vicinity of the fuel fed heater. In the case of providing energy to a heating coil, only an insulated electrical connector is necessary. When an electric arc is to be provided, it is necessary to change the direct current to alternating current, and to increase the voltage with a step-up transformer. The electrical energy then proceeds through a spark gap configuration.

A catalytic ignitor is provided in tubular form, having permeable interior and exterior walls, with a baffling material and catalytic material located between the permeable walls. Fuel gas containing hydrogen is provided to the interior of the ignitor, and air is provided to the exterior of the ignitor. The hydrogen and air spontaneously react in the presence of the catalyst. This reaction provides sufficient heat for ignition of natural gas and air.

3

A complete understanding of this invention may be had by reference to the following description, when read in conjunction with the accompanying drawings illustrating embodiments thereof.

BRIEF DESCRIPTION OF THE DRAWINGS

FIG. 1 and 1A depict a battery powered ignitor, including apparatus for generating an electric arc;

FIG. 2 and 2A illustrate a battery powered ignitor capable of delivering high voltage;

FIGS. 3, 3A, and 3B illustrate a battery powered ignitor to be used in conjunction with a heating element.

DESCRIPTION OF THE PREFERRED EMBODIMENTS

Figures 4, 4A:
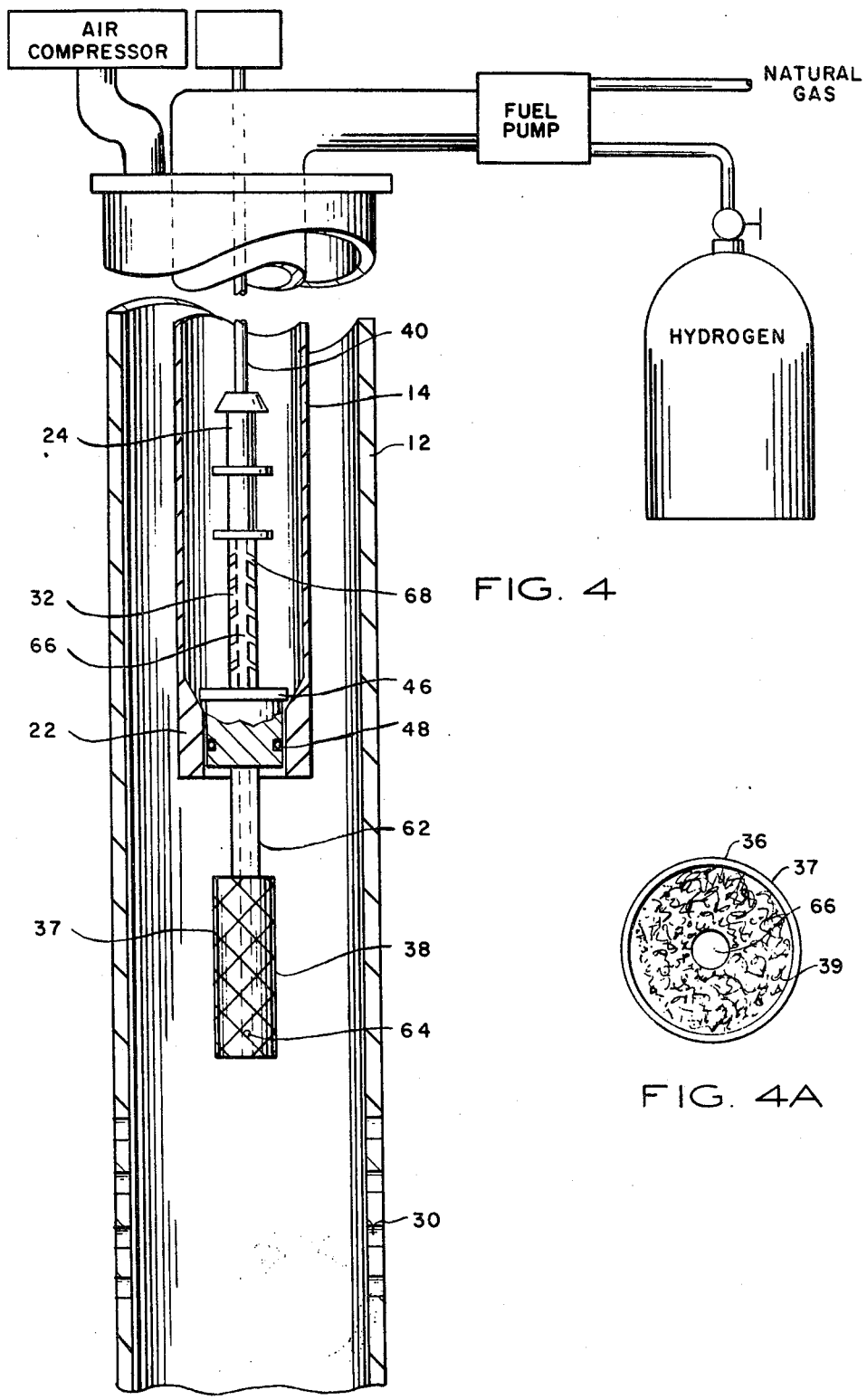
FIGS. 4 and 4A depict a catalytic ignitor.

Referring first to FIG. 1, there is seen a series of batteries 70 suspended from a wireline 76. The batteries 70 are located above a pressure switch 80. An electrode probe 74 terminates in a spark gap configuration 86, having electrodes 82. Connected between the pressure switch 80 and the electrode probe 74 is equipment for changing the direct current, emanating from batteries 70, to alternating current. The voltage of the electrical energy is then increased by a step-up transformer. This equipment is illustrated in FIG. 1A. Located on the electrode probe 74 is a stopping member 88 which is adjustable in that it can be located along the entire length of the electrode probe 74. The stopping member 88 is used to contact a well heater located in a wellbore such as those described in greater detail in co-pending application entitled "METHOD AND APPARATUS FOR IGNITION AND HEATING OF EARTH FORMATIONS" Ser. No. 889,061 filed of even date herewith. Upon the stopping member 88 contacting the well heater, the weight of the batteries closes pressure switch 80. Pressure switch 80 consists of springs 90 and electrical contacts 92 and 94. In FIG. 1A is an illustration of the circuitry between pressure switch 80 and electrode probe 74. Batteries in battery pack 70 provide direct electrical current to oscillator 78, which converts the direct electrical energy to alternating electrical energy. The alternating energy is then supplied to high voltage step-up transformer 96, which increases the voltage being supplied to electrodes 82. Referring once again to FIG. 1, there is then provided high voltage alternating electrical energy to the spark gap 86.

Thus, in operation, when the ignitor 72 is lowered into the wellbore by wireline 76, the batteries are not connected to the electrode 82. Upon the stopping member 88 contacting a heater located in a wellbore, the pressure switch 80 is closed because of the compression of springs 90 by the weight of batteries 70. When pressure switch 80 is closed, the energy is supplied by battery 70 through the oscillator 78 and high voltage step-up transformer 96 to the electrodes 82. Sufficient voltage should then be available to create electric arcs across spark gap 86, thereby initiating combustion of fuel gas being supplied to the heater.

FIG. 2 illustrates a similar ignitor to the one shown in FIGS. 1 and 1A, with the exception that there is no spark gap configuration located at the end of electrode probe 74. This ignitor is used in conjunction with the well heaters having spark gaps built therein shown in co-pending application of even date herewith entitled "METHOD AND APPARATUS FOR IGNITION AND HEATING OF EARTH FORMATIONS", Ser. No. 889,061. A pressure switch as shown at 80 in FIG. 1 is not necessary in this ignitor, since there is no connection between the high voltage at electrodes 82 and a spark gap until the ignitor is in contact with the heater. As in FIG. 1, batteries 70 attached to wireline 76 are connected to an electrode probe 74 which terminates with electrodes 82. Between batteries 70 and the electrode probe 74 is located the circuitry necessary for supplying high voltage to the electrodes 82. This circuitry is illustrated in FIG. 2A. There batteries 70 supply direct electrical energy to oscillators 78 which convert the direct current to alternating current. The current is then supplied to high voltage step-up transformer 96 where the voltage is increased sufficiently to supply the energy necessary for an electric arc. Thus when the ignitor 72 is located in a well heater having a spark gap configuration located therein, the contact of the electrodes 82 with the spark gap in the heater causes an electric arc across the spaced electrical contacts in the spark gap.

FIG. 3 is illustrative of a battery powered ignitor for use with well heaters that have heating elements located in the heater. The batteries 70 attached to wireline 76 have electrodes 82 attached to it by electrical cable 79. When lowered into a wellbore for igniting a well heater located at the bottom of the wellbore, the electrodes 82 come into contact with mating contact electrodes 52 illustrated in FIG. 3B. These mating electrical contacts 52 are built into the heater, and are attached to heating element 44, which is essentially a resistor. When in contact, electrical current flows from the electrodes 82 to the heating element 44, thereby generating heat for igniting the well heater.

FIG. 3A illustrates the bottom of the ignitor shown in FIG. 3 illustrating how the electrodes 82 are arranged on the ignitor. In lieu of having the heating element 44 constructed in the heater, it may be attached to the ignitor and simply brought into contact with the heater. This ignitor is especially adaptable to catalytic heaters as described in co-pending application entitled "METHOD AND APPARATUS FOR CATALYTIC IGNITION OF EARTH FORMATIONS", Ser. No. 889,059, now abandoned filed of even date herewith. It would be necessary to raise the temperature to a level at which natural gas would react with air in the presence of a catalytic material, i.e.; approximately 250° F. A guide means would be needed in the heater for receiving the ignitor.

FIGS. 4 and 4A illustrate a catalytic ignitor for use in igniting fuel fed heaters. This ignitor is also especially adaptable to igniting the heaters described in co-pending application entitled "METHOD AND APPARATUS FOR IGNITION AND HEATING OF EARTH FORMATIONS", Ser. No. 889,061 filed of even date herewith. The above copending application, Ser. No. 889,061 is hereby incorporated by reference.

FIG. 4 shows an ignitor 38 located in a wellbore inside of casing 12 and extending into tubing 14. The ignitor is seated in seating nipple 22 by contacting a "no-go" flange 46. The catalytic surface 37 is sealed from the interior of the tubing 14 by "O-rings" 48, and is separated from the seating nipple 22 by lower stand-off member 62. Air is flowed down the annulus between the casing 12 and tubing 14 to be in communication with the exterior of the ignitor 38 and to force fluids from the wellbore away from the formation adjacent the wellbore. A hydrogen containing fuel gas is flowed down the tubing 14 and enters gas inlet ports 68 located in upper stand-off member 32. Fuel gas then flows down pipe interior 66 to the interior of the ignitor 38. Upon the hydrogen contacting the catalytic surface 37, the hydrogen will react with the air.

The state of the reaction can be monitored by utilization of thermocouple 64, which is attached to an armored thermocouple cable 40, which extends to the surface where an indicator (not shown) reflects the temperature at the ignitor corresponding to the electromotive force generated by the thermocouple 64. The thermocouple cable 40 is connected to the ignitor by cable head and thermocouple hanger assemblies 24. The reaction temperature of the hydrogen and air at the catalytic surface 37 is sufficient to initiate a catalytic reaction of natural gas and air, whereupon the hydrogen portion of the fuel may be terminated. Whether there is a sufficient temperature for natural gas and air to react in the presence of the catalyst is determined by information received from thermocouple 64. Once a natural gas and air reaction has commenced, the temperature will be sufficient to cause a natural gas and air mixture to burn at the heater.

The make-up of the catalytic portion of the ignitor is depicted by a cross-section of the ignitor shown in FIG. 4A. There is shown a screen type retaining means 36 adjacent the catalytic surface 37. Baffling material 39, preferably a fiberized silica material such as FIBERGLASS or CERAFELT is positioned between the retaining means 36 and the wall of the pipe interior 66. In the catalytic section, the pipe interior 66 is perforated to provide a passageway for the fuel gas to reach the catalytic surface 37. The function of the baffling material 39 is to diffuse the fuel gas so that it spreads over the entire cataltyic surface 37. This baffling material 39 is arranged such that there is only a slight pressure drop as the fuel gas exits the ignitor 38. The screen type retaining means 36 is rigid enough to provide shape to the catalytic area of the heater so that it is not easily deformed.

The catalytic material used in the ignitor may be selected from a wide list of materials and forms no part of this invention. The preferable catalyst is platinum on a heat resistant support such as asbestos or ceramic material. Other catalysts suitable for oxidation of the fuel gas include the platinum group metals and their oxides. Many other catalytic materials may be used in this reaction and are well known to those of skill in the catalytic material art.

Modifications may be necessary in the upper portion of the ignitor 38 to adapt it to conform to the requirements of specific heaters. Care should be taken regarding the fuel and air mixture present in the wellbore. If the mixture contains approximately 5 to 15 per cent methane, with the remainder air, it is explosive. Also, if the mixture is approximately 4 to 74 per cent hydrogen with the remainder air, explosions occur. Therefore, in the operation of this ignitor to avoid explosive mixtures, an air to fuel ratio of at least 25 to 1 should be used.

Utilization of a hydrogen-natural gas fuel mixture allows for a higher fuel injection rate. If hydrogen alone were used, approximately 6 cu. ft. of hydrogen per hour per square foot of catalyst surface could be injected. With a natural gas-hydrogen mixture, injection rates can be increased to 20 to 25 standard cu. feet per hour per square foot of catalyst surface. Since hydrogen is not readily available in large quantities, it is best to operate the ignitor with the hydrogen-natural gas fuel mixture only until the natural gas starts to react. At that point the hydrogen is no longer necessary. The fuel injection rate of natural gas alone is ordinarily 20 to 45 standard cu. ft. per hour per square foot of catalyst surface. This natural gas-air reaction will go to flame given a high enough fuel injection rate. Once flame is initiated, the heater is ignited and the ignitor 38 can be withdrawn from the wellbore by cable 40. In this regard, ignitor 38 is smaller in diameter than tubing 14 to permit withdrawal through the tubing 14.

Referring to the ignitor illustrated in FIG. 4, it is presumed that a heater would be surrounding the catalytic portion of the ignitor and the heater would be encircled by a heat shield to protect the casing 12. Perforations 30 are shown below the ignitor 38 and allow heated air to enter the formation.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. Apparatus for igniting a fuel fed well heater located in a wellbore comprising: a catalytic material on a heat resistant support adapted to be located adjacent the well heater, first conduit means extending from the earth's surface and providing a fluid flow path from the surface to the catalytic material, means for directing one portion of a fuel mixture through the first conduit means to one side of the catalytic material and means for diffusing such one portion of the fuel mixture over the catalytic material before contacting, another portion of the fuel mixture, and second conduit means extending from the surface for providing a fluid flow path for the other portion of the fuel mixture.

2. The apparatus of claim 1 wherein the catalytic material is a part of a tubular member having a permeable inner wall, a permeable retaining means constituting on outer wall and baffle means located between the inner and outer walls, and wherein the catalytic material is located adjacent the retaining means.

3. Apparatus for igniting a well heater located in a wellbore comprising: a well heater positioned in the wellbore, igniter means suspended in the wellbore on a conduit and including catalytic material located adjacent the heater; means for introducing air to one side of the catalytic material between the material and the heater; and means for introducing a hydrogen containing fuel gas to the other side of the catalytic material.

4. The apparatus of claim 3 including temperature determining means located on the surface of the catalytic material.

5. The apparatus of claim 4 wherein the temperature indicating means is a thermocouple, located on the surface of the catalytic material, attached to a thermocouple cable which extends to the surface.

6. Apparatus for igniting a well heater located in a wellbore comprising: a tubular member having a permeable wall; first conduit means extending from the earth's surface into the wellbore for introducing air to the outer surface of the permeable wall of the tubular member; second conduit means extending from the earth's surface into the wellbore for introducing a fuel gas to the inner surface of the permeable wall of the tubular member; and a catalytic material adjacent the outer surface of the permeable wall of the tubular member.

7. The apparatus of claim 6 including means adjacent the inner surface of the permeable wall for diffusing the fuel gas over the entire surface of the outer surface of the permeable wall.

8. The apparatus of claim 6 including means for determining temperature located on the tubular member, and means for transmitting temperature indications to the surface.

9. Apparatus for igniting a well heater located in a wellbore adjacent a formation to be heated comprising: pipe means suspended in the wellbore and having an igniter attached thereto, a tubular member located in the interior of the igniter and having a catalytic material located adjacent the exterior wall of said tubular member; fluid passage means extending from the earth's surface into the wellbore for introducing air to the catalytic material on the exterior wall of the tubular member without passing over the interior wall thereof; separate fluid passage means for flowing a fuel gas to the interior wall of the igniter; and means for flowing the fuel gas from the interior wall to the exterior wall.

10. The apparatus of claim 9 including baffle means located between the interior and exterior walls, for diffusing the fuel gas so that said gas is distributed over the entire exterior wall.

11. The apparatus of claim 10 wherein the exterior wall is a screen and the interior wall is perforated pipe and wherein the screen retains the catalytic material and baffle means.

12. The apparatus of claim 10 wherein the baffle means is a fibrous silica material.

13. Process for igniting a well heater located in a wellbore comprising: positioning a well heater in the wellbore, locating an igniter including a catalytic material adjacent the well heater; and initiating a catalytic reaction of hydrogen and air by flowing a hydrogen containing fuel gas into contact with one surface of the catalytic material and flowing air into contact with the other surface of the catalytic material.

14. The process of claim 13 wherein the fuel gas mixture comprises gaseous hydrocarbons and hydrogen.

15. The process of claim 14 including monitoring the temperature of the catalytic reaction.

16. The process of claim 15 including terminating the flow of the hydrogen portion of the fuel gas when the catalytic reaction temperature of the hydrocarbon is reached.

17. A process for igniting portions of a wellbore comprising: locating an igniter having a catalytic covered member on a conduit forming a first fluid flow path from the surface to the igniter in the wellbore, passing a fuel gas through the conduit to one surface of the tubular member, passing an oxidizing agent through a separate fluid flow path to the other surface of the tubular member to thereby maintain the fuel gas and oxidizing agent separated until they are combined on the catalytic covered member.

* * * * *